US012652177B2

(12) United States Patent
Liu

(10) Patent No.: US 12,652,177 B2
(45) Date of Patent: Jun. 9, 2026

(54) VERIFYING SECURE SOFTWARE IMAGES USING DIGITAL CERTIFICATES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 183 days.

(21) Appl. No.: 17/575,593

(22) Filed: Jan. 13, 2022

(65) Prior Publication Data

US 2023/0224169 A1     Jul. 13, 2023

(51) Int. Cl.
*H04L 9/32* (2006.01)
*G06F 21/57* (2013.01)
*H04L 9/08* (2006.01)
(52) U.S. Cl.
CPC .......... *H04L 9/3263* (2013.01); *G06F 21/575* (2013.01); *H04L 9/0825* (2013.01); *H04L 9/3247* (2013.01)
(58) Field of Classification Search
CPC .... G06F 21/545; G06F 21/552; G06F 21/565; G06F 21/566; G06F 11/1469
See application file for complete search history.

(56) References Cited

U.S. PATENT DOCUMENTS

| | | | | |
|---|---|---|---|---|
| 2005/0192907 A1* | 9/2005 | Blinn | ..................... | G07F 9/002 |
| | | | | 705/59 |
| 2006/0236379 A1* | 10/2006 | Negahdar | ............. | H04L 9/3263 |
| | | | | 726/5 |
| 2009/0217047 A1* | 8/2009 | Akashika | ................ | G06F 21/33 |
| | | | | 713/175 |
| 2014/0115324 A1* | 4/2014 | Buer | ....................... | H04L 9/085 |
| | | | | 713/155 |
| 2015/0363575 A1* | 12/2015 | Vlot | ...................... | G06F 21/105 |
| | | | | 726/29 |
| 2018/0198629 A1* | 7/2018 | Deymonnaz | .......... | H04L 9/0894 |
| 2020/0250344 A1* | 8/2020 | Rahn | ...................... | H04L 9/3236 |
| 2022/0045859 A1* | 2/2022 | Zhang | ........................ | H04L 9/14 |
| 2022/0342657 A1* | 10/2022 | Amundsen | ............ | G06F 9/4401 |

* cited by examiner

*Primary Examiner* — Viet D Vu
(74) *Attorney, Agent, or Firm* — Greenberg Traurig

(57) ABSTRACT

The embodiments relate to improved security in computing devices. In some aspects, the techniques described herein relate to a device including: a secure storage area, the secure storage area including a first public key written during manufacturing of the device; a controller configured to: receive data, the data including a payload, digital certificate, and digital signature, validate the digital certificate using the first public key, extract a second public key from the digital certificate; validate the digital signature using the second public key; and process the payload.

20 Claims, 7 Drawing Sheets

100

Secure Device 102

| Controller 134 |
| --- |
| Signature Validation 132 |
| Certificate Validation 130 |
| Key Storage 136 |

Vendor 106

Keys 120

Images 124

Certificates 126

| Signature Generator 122 |
| --- |
| API 128 |

Server 104

Vendor DB 114

| API 116 |
| --- |

| Certificate Generator 118 |
| --- |

| Key Writer 112 |
| --- |

| Key Generator 108 |
| --- |

| Key Storage 110 |
| --- |

VERIFYING SECURE SOFTWARE IMAGES USING DIGITAL CERTIFICATES

FIELD OF THE TECHNOLOGY

At least some embodiments disclosed herein relate generally to semiconductor devices and, in particular, to securing software images executing on such semiconductor devices.

BACKGROUND

Secure and measured boot devices validate software images before they are executed. Such devices use asymmetric cryptography to ensure that a given image is not tampered with prior to writing to a storage area or execution by a computing device. Such devices implement this functionality via rigid requirements on key storage and retrieval.

DETAILED DESCRIPTION

Figure 1:
FIG. 1 is a block diagram of a computing system for securing software and firmware images according to some of the example embodiments.

In current secure or measured boot systems, software and firmware images (referred to collectively as "images") are guaranteed secure via cryptography. In many such systems, a tamper-proof public key is used to validate a digital signature of any given software image (e.g., firmware or software images). Images are signed with a private key corresponding to the public key on the device and thus allow the device to validate images before executing them. Specifically, before loading and executing such an image, the device can compute a digest (e.g., a hash) of the image and verify the digest against a digital signature matching the image. If the digest and the digital signature do not match, the device can reject loading and/or executing the image, maintaining the integrity of the system.

While the above mechanism provides security of images, it suffers from various technical limitations not solved in current systems. First, such devices generally only store a single public key that is used to validate digital signatures. Some devices allow for a fixed number of public keys; however, no system allows for an arbitrary number of public keys. As such, only a single (or fixed number) of public keys can be used to verify images. Second, due to the use of a single key (or a small number of keys), only a few vendors can provide images for a secure device. Given the number of vendors supplied images for a device, a central server is often required to sign these images, which reduces the speed at which images can be deployed (potentially exposing security vulnerabilities). Third, in addition to being tamper-proof, public keys are often irrevocable. Thus, once all available public key slots are filled, no additional public keys can be provided to the device. Further, if the corresponding private keys are compromised, there is no software-controlled method to remove the corresponding public keys, rendering such devices insecure.

The example embodiments remedy these and other issues with secure or measured boot devices. In brief, the example embodiments illustrate a secure or measured boot device that allows for an image provider to use any asymmetric key to sign such images. During manufacturing, a device manufacturer writes a server public key (pk$_S$) to a device and retains the server private key (sk$_S$) in a secure location (e.g., hardware security module). When a vendor wishes to write a new software image, the vendor provides its public key (pk$_V$) to the server. The server can then generate a certificate using the vendor's public key (cert$_V$) and signed with the server private key (sk$_S$). The server then provides the certificate (cert$_V$) to the vendor in response to receiving the public key (pk$_V$).

The vendor can then sign the image using its private key (sk$_V$) to generate a signature (sig$_i$) for the image. The vendor then supplies the image (i), signature (sig$_i$), and the certificate (cert$_V$) to the secure device.

Upon receiving the image (i), signature (sig$_i$), and certificate (cert$_V$), the device validates the digital certificate (cert$_V$) using a certificate authority (CA) or similar mechanism. If the digital certificate (cert$_V$) is valid, the device can then extract the public key (pk$_V$) stored in the digital certificate (cert$_V$). Since the digital certificate (cert$_V$) was validated, the device can presume that the public key provided by the vendor (pk$_V$) is valid. Thus, the device can then validate the digital signature (sig$_i$) using the vendor public key (pk$_V$). If the signature (sig$_i$) is valid, the device can load and/or execute the image (i). If the signature (sig$_i$) is not valid, the device can reject the image (i).

The foregoing technique can be used in other scenarios besides loading or updating images. For example, the foregoing technique can be used at each boot to validate a previously written image. As another example, the foregoing technique can be used to validate individual commands.

The example embodiments provide advantages over existing secure or measured boot systems.

In the example embodiments, any private key can be used to generate a signature for an image, but only one public key needs to be saved in a device to validate the signature. Therefore, any vendor can generate and manage their own keys and generate a signature for an image as long as the server trusts the vendors and grants a corresponding certificate. Additionally, the validation period of update images, secure commands, and boot images can be controlled by the certification validation period.

In some aspects, the techniques described herein relate to a device including: a secure storage area, the secure storage area including a first public key written during manufacturing of the device; a controller configured to: receive data, the data including a payload, digital certificate, and digital signature, validate the digital certificate using the first public key, extract a second public key from the digital certificate; validate the digital signature using the second public key; and process the payload.

In some aspects, the techniques described herein relate to a device, wherein the processor is configured to receive the data from a remote computing system, and wherein the payload includes a software image.

In some aspects, the techniques described herein relate to a device, wherein processing the payload includes writing the software image to a storage device.

In some aspects, the techniques described herein relate to a device, wherein the payload includes a bootloader stored by the device and wherein processing the payload includes executing the bootloader.

In some aspects, the techniques described herein relate to a device, processor is configured to receive the data from a remote computing system, and wherein the payload includes a command.

In some aspects, the techniques described herein relate to a device, wherein processing the payload includes executing the command.

In some aspects, the techniques described herein relate to a device, wherein validating the digital certificate includes determining that the digital certificate is not expired.

In some aspects, the techniques described herein relate to a device, wherein the digital certificate is signed using a private key corresponding to the first public key.

In some aspects, the techniques described herein relate to a method including: receiving, by a computing device, data, the data including a payload, digital certificate, and digital signature; validating, by the computing device, the digital certificate using a first public key, the first public key written during manufacturing of the computing device; extracting, by the computing device, a second public key from the digital certificate; validating, by the computing device, the digital signature using the second public key; and processing, by the computing device, the payload.

In some aspects, the techniques described herein relate to a method, wherein receiving data includes receiving the data from a remote computing system, and wherein the payload includes a software image.

In some aspects, the techniques described herein relate to a method, wherein processing the payload includes writing the software image to a storage device.

In some aspects, the techniques described herein relate to a method, wherein the payload includes a bootloader stored by the device and wherein processing the payload includes executing the bootloader.

In some aspects, the techniques described herein relate to a method, wherein receiving data includes receiving the data from a remote computing system, and wherein the payload includes a command.

In some aspects, the techniques described herein relate to a method, wherein processing the payload includes executing the command.

In some aspects, the techniques described herein relate to a method, wherein validating the digital certificate includes determining that the digital certificate is not expired.

In some aspects, the techniques described herein relate to a method, wherein the digital certificate is signed using a private key corresponding to the first public key.

In some aspects, the techniques described herein relate to a non-transitory computer-readable storage medium for tangibly storing computer program instructions capable of being executed by a computer processor, the computer program instructions defining steps of: receiving data, the data including a payload, digital certificate, and digital signature; validating the digital certificate using a first public key, the first public key written during manufacturing of the non-transitory computer-readable storage medium; extracting a second public key from the digital certificate; validating the digital signature using the second public key; and processing the payload.

In some aspects, the techniques described herein relate to a non-transitory computer-readable storage medium, wherein receiving data includes receiving the data from a remote computing system, wherein the payload includes a software image, and wherein processing the payload includes writing the software image to a storage device.

In some aspects, the techniques described herein relate to a non-transitory computer-readable storage medium, wherein the payload includes a bootloader stored by the device and wherein processing the payload includes executing the bootloader.

In some aspects, the techniques described herein relate to a non-transitory computer-readable storage medium, wherein receiving data includes receiving the data from a remote computing system, wherein the payload includes a command, and wherein processing the payload includes executing the command.

FIG. 1 is a block diagram of a computing system for securing software and firmware images according to some of the example embodiments.

In an embodiment, system 100 includes a secure device 102, server 104, and vendor system 106.

In an embodiment, server 104 can comprise one or more computing devices to provide centralized control of secure devices and cryptographic operations. In an embodiment, server 104 includes a key generator 108, a key writer 112, and key storage 110. In an embodiment, the key generator 108 can include an asymmetric key generator configured to generate public and private keys. In an embodiment, key generator 108 can implement any asymmetric key generation algorithm or form part of any asymmetric cryptographic system including, without limitation, Rivest-Shamir-Adleman (RSA), Digital Signature Algorithm (DSA), Edwards-curve Digital Signature Algorithm (EdDSA), Elliptic Curve Digital Signature Algorithm (ECDSA), Elliptic-curve Diffie-Hellman (ECDH), etc.

The key generator 108 can write private keys to key storage 110. In an embodiment, the key storage 110 can comprise a hardware security module (HSM) or similar storage device. In general, key storage 110 can securely store sensitive information such as private keys and can provide secure and limited access to such keys. The key generator 108 can also provide public keys to key writer 112. In an embodiment, the key writer 112 can comprise one or more computing systems that can write public keys to secure devices prior to being released from manufacturing. Examples of secure devices include memory devices, computing systems, embedded devices, microprocessors, etc. In some embodiments, key writer 112 can write server-generated public keys to secure regions of the secure devices (e.g., write-protected regions). Details of generating key pairs, writing public keys to secure devices, and storing private keys are provided in FIG. 2.

In an embodiment, server 104 includes an application programming interface (API 116). In an embodiment, the API 116 allows a vendor system 106 to issue requests to server 104 and allows server 104 to respond to such requests. As will be discussed, API 116 can receive requests for certificates from vendor system 106. Such requests can include a public key of the vendor ($pk_V$). The API 116 can validate the requests by authenticating the requests against a database 114 of approved vendors and authorizing the request based on one or more permissions for the authenticated vendor. When authenticated and authorized, the API 116 can forward the public key to a certificate generator 118, which can generate a digital certificate (cert$_V$) for the vendor. The certificate generator 118 can generate a digital certificate based on a self-signed certificate signing request (CSR) received from a vendor. In some embodiments, the CSR can include the vendor's public key (pk$_V$) and be signed with a private key stored in the key storage 110. In some embodiments, the request to generate a certificate can include a device identifier and the certificate generator 118 can load a private key (sk$_S$) that corresponds to the device (via the device identifier) and use that private key (sk$_S$) as the signing key. The certificate generator 118 can return the digital certificate (cert$_V$) to the API 116, which can return the digital certificate (cert$_V$) to the vendor system 106. Details of generating digital certificates are provided in FIGS. 3 through 5.

In an embodiment, vendor system 106 can comprise one or more computing devices operated by a vendor. As used herein, a vendor can comprise any entity that writes data to secure devices. For example, the vendor can comprise a software developer that generates bootloader images.

The vendor system 106 includes an API 128 for accessing server 104. In some embodiments, the API 116 can comprise a network API or a software interface for accessing (e.g., issuing requests) to server 104. In an embodiment, vendor system 106 includes a database 120 for storing key data. In some embodiments, the database 120 can include an HSM or similar secure storage device. In some embodiments, database 120 can store public and/or private keys generated by the vendor system 106 via a key generator (not illustrated). In some embodiments, the key generator can be a similar asymmetric key generator to that of server 104. The vendor system 106 further includes a certificates database 126. In some embodiments, the certificates database 126 can be implemented as an HSM. In some embodiments, the database 120 and certificates database 126 can be implemented in the same HSM. In some embodiments, the database 120 and certificates database 126 can comprise any tamper-proof storage device and an HSM is provided only as one example of an adequate storage mechanism. In an embodiment, the API 128 can read public keys from database 120 and issue requests for digital certificates to server 104. In response to receiving a digital certificate, API 128 can store the digital certificate in the certificates database 126 for future use.

The vendor system 106 further includes a signature generator 122. In an embodiment, the signature generator 122 is configured to read images from database 124. In an embodiment, database 124 can store software images to write to secure device 102. Examples of software images include bootloaders, operating systems, firmware, etc. The signature generator 122 can read a given image and sign the image using a private key stored in database 120. In some embodiments, the signature generator 122 can select the private key based on a device identifier of the secure device 102. In some embodiments, the signature generator 122 can then load a digital certificate corresponding to the secure device 102 from certificates database 126. In some embodiments, the API 128 can also transmit commands to the secure device 102. Details of the operation of vendor system 106 are provided in FIGS. 3 through 5.

In some embodiments, the signature generator 122 provides an image, digital certificate, and a digital signature to the API 128 for transmittal to the secure device 102.

In an embodiment, the secure device 102 can receive data from vendor system 106 and process the data. In an embodiment, the secure device 102 can include a key storage area 136 for storing server public keys. In some embodiments, the key storage area 136 can comprise a write-protected area of a storage array. In an embodiment, a certificate validation module 130 can receive data from vendor system 106 and validate the data before executing the image or command. In an embodiment, the certificate validation module 130 can validate the received digital signature using the server public key stored in key storage area 136. In some embodiments, the certificate validation module 130 can extract the vendor public key from the digital certificate when the certificate is validated and provide the public key to signature validation module 132. In response, the signature validation module 132 can validate the digital signature received from vendor system 106 using the public key in the digital certificate. When the digital signature is validated, the payload (e.g., image or command) is transmitted to a controller 134 for further processing. In some embodiments, controller 134 can implement some or all of the functionality of certificate validation module 130 and signature validation module 132. Details of the operation of secure device 102 are provided in FIGS. 3 through 5.

Figure 2:
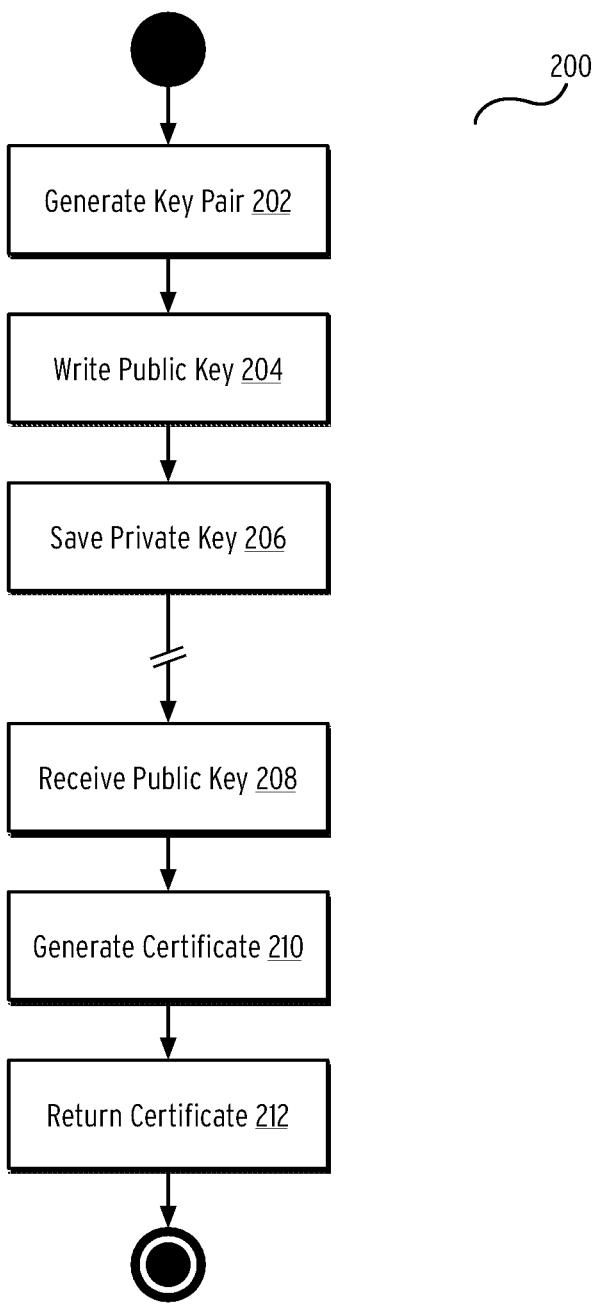
FIG. 2 is a flow diagram illustrating a method for managing cryptographic keys on secure devices and digital certificates for vendors according to some of the example embodiments.

FIG. 2 is a flow diagram illustrating a method for managing cryptographic keys on secure devices and digital certificates for vendors according to some of the example embodiments.

In step 202, method 200 can include generating an asymmetric key pair.

In some embodiments, method 200 can be executed by a centralized server. In some embodiments, the centralized server can be associated with a manufacturer of storage or other semiconductor-based devices. In some embodiments, the asymmetric key pair can comprise any key pair generated via a well-defined asymmetric key generation algorithm. Examples of such algorithms include RSA, DSA, EdDSA, ECDSA, ECDH, etc. No limit is placed on the type of algorithm or cryptosystem used to generate an asymmetric key pair, provided it generates a public key and corresponding private key.

In step 204, method 200 can include writing the public key (pk$_S$) of the asymmetric key pair generated by the server to a device.

As used herein, a device refers to any type of storage or computing device that processes commands or software images. Examples of devices include memory devices, computing systems, embedded devices, microprocessors, etc. In some embodiments, method 200 can perform step 204 during the manufacturing of the device. That is, in some embodiments, method 200 can perform step 204 prior to releasing the device from manufacturing. In some embodiments, step 204 can include writing the public key (pk$_S$) to a tamper-proof location of the device. For example, step 204 can include writing the public key (pk$_S$) to a write-protected region of a storage array or similar storage area. In some embodiments, the device can include physical fuses that store the public key (pk$_S$) and prevent software-based tampering. In some embodiments, the public key (pk$_S$) can be permanently stored in the device. In other embodiments, the public key (pk$_S$) can be modifiable (either manually or via a secure, remote command).

In step 206, method 200 can include saving the private key (sk$_S$) of the asymmetric key pair to a key storage device.

In some embodiments, the key storage device comprises a secure storage area accessible by the server. In some embodiments, the key storage device can comprise an HSM or similar type of secure storage device. In some embodiments, the key storage device can be local to the server. In other embodiments, the key storage device can comprise a remote or cloud-based key storage device. In some embodiments, the key storage device can be operated by the operator of the server. In other embodiments, the key storage device can be operated by a trusted third party.

After step 206, method 200 can include releasing the device from manufacturing. In some embodiments, the manufacturer of the device or downstream vendors can then provide the device to customers for usage.

As illustrated, a period of time can occur between step 206 and step 208. The disclosure places no limit on the duration of time between step 206 and step 208.

In step 208, method 200 can include receiving a public key ($pk_V$) from a vendor.

In some embodiments, the public key ($pk_V$) can be generated by a vendor (not illustrated). In some embodiments, the public key ($pk_V$) can form part of an asymmetric key pair. As in step 202, the algorithm used to generate the public key ($pk_V$) is not limiting and can comprise any well-defined asymmetric key generation algorithm or cryptosystem such as RSA, DSA, EdDSA, ECDSA, ECDH, etc. In some embodiments, the key generation technique used by the vendor matches that used by the server in step 202; however, in some embodiments, the techniques can be different. In some embodiments, the vendor can provide an identification of the key generation algorithm used to generate a public key ($pk_V$) when providing the public key ($pk_V$) to the server.

In some embodiments, method 200 can include a step of authenticating and confirming the authorization of the vendor. In some embodiments, the vendor can authenticate via a login procedure or other type of authentication procedure prior to step 208. In such an embodiment, method 200 can include confirming the vendor's identity prior to accepting the public key ($pk_V$) from the vendor. Similarly, method 200 can also include determining whether the vendor is authorized to receive certificates (discussed next) or not. In some embodiments, each vendor can be associated with a set of permissions. These permissions can be binary, defining whether or not the vendor is allowed to apply for a certificate. Alternatively, or in conjunction with the foregoing, the permissions can specify the total number of certificates a vendor is allowed, the validity period of certificates, etc. In some embodiments, method 200 can include authenticating the vendor and verifying such permissions prior to proceeding to step 208.

In step 210, method 200 can include generating a digital certificate ($cert_V$) for the vendor in response to receiving a CSR including the public key ($pk_V$) of the vendor.

In some embodiments, step 210 can include receiving a CSR from a vendor, such as a CSR formatted according to the PKCS #10 specification. In some embodiments, the vendor can self-sign the CSR. In some embodiments, the CSR can include various fields used by the CA to generate a certificate. For example, the CSR can include a common name and organization name of the server and/or server operator. In the embodiments, the CSR includes the public key ($pk_V$) of the vendor. The CSR can include additional fields as needed, provided that the public key ($pk_V$) is used as the public key in the CSR. Further, method 200 can use alternative data for the various fields (e.g., using the vendor's name as the Organization Name). After establishing all fields of the CSR, the server generates a digital certificate from the CSR using its own private key ($sk_S$). Specific details of the operations of generating a digital signature are not limiting, and any standard operations needed to issue a digital certificate ($cert_V$) in response to a CSR fall within the scope of the disclosure. Thus, method 200 can validate the CSR and generate a digital certificate ($cert_V$). In brief, method 200 can generate and sign (as one example) an X.509 certificate in response to a vendor CSR.

In step 212, method 200 can include returning the digital certificate ($cert_V$) to the vendor.

In some embodiments, step 208 can be triggered by a vendor calling a network endpoint via, for example, a Hypertext Transfer Protocol (HTTP) application programming interface (API) (e.g., a representational state transfer API). In step 208, the vendor can include its public key ($pk_V$) as a parameter (either query or body) of such a request, and in step 212, method 200 can return the digital certificate ($cert_V$) as the response body. If errors occur at any step, method 200 can include returning an error code (e.g., HTTP response code) to the vendor indicating the error. As will be discussed next, a vendor can then use the digital certificate ($cert_V$) to issue images or commands to a device.

Figure 3:
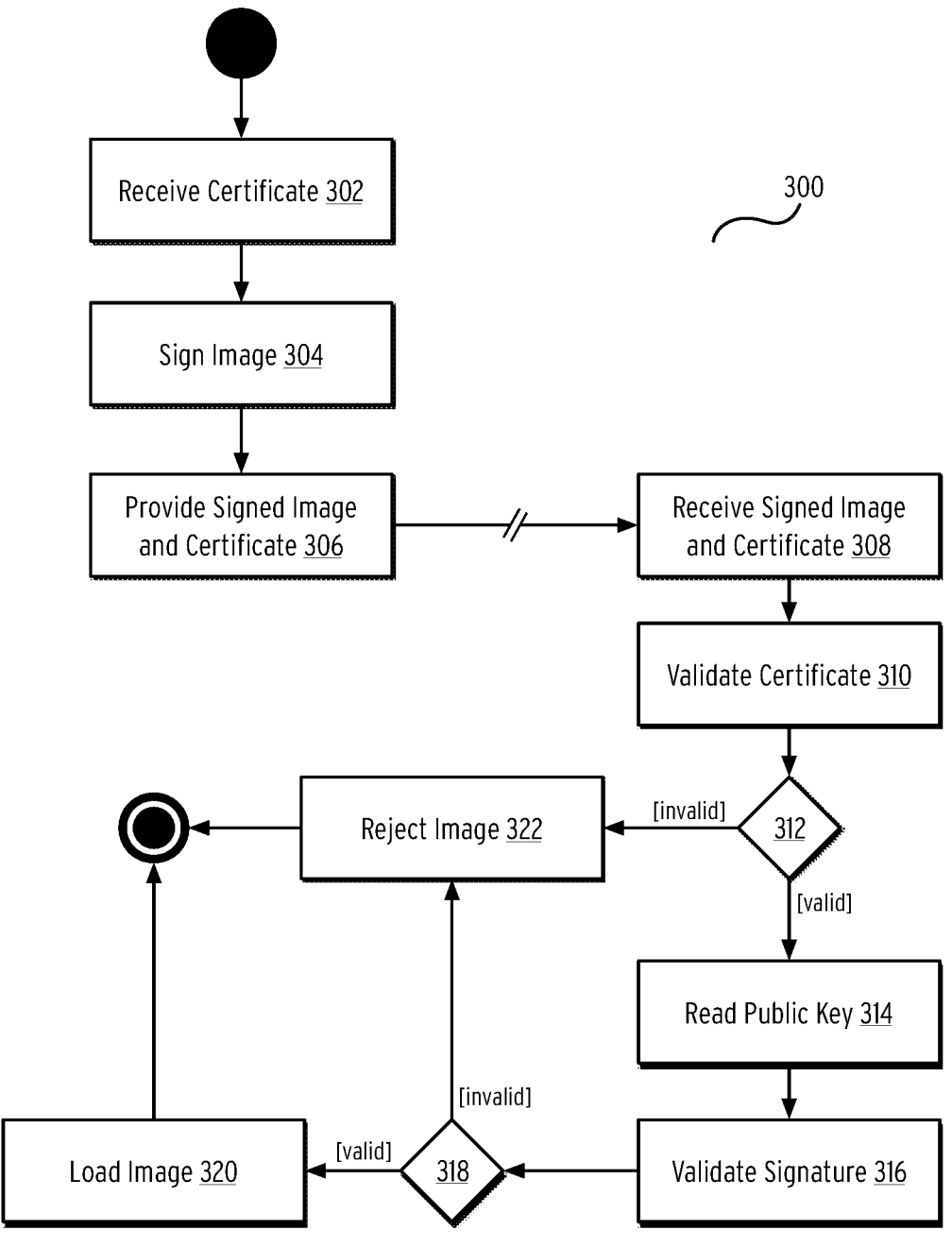
FIG. 3 is a flow diagram illustrating a method for generating and validating a secure image according to some of the example embodiments.

FIG. 3 is a flow diagram illustrating a method for generating and validating a secure image according to some of the example embodiments.

In step 302, method 300 can include a vendor receiving a digital certificate ($cert_V$) from a server. In some embodiments, the digital certificate ($cert_V$) corresponds to the digital certificate ($cert_V$) returned in step 212 of FIG. 2 and details of that digital certificate ($cert_V$) are not repeated herein. In brief, the digital certificate ($cert_V$) is generated by a server using the vendor's public key ($pk_V$) using a CSR signed by the vendor.

In step 304, method 300 can include signing an image. In some embodiments, step 304 can include signing a software image using a private key ($sk_V$) of the vendor. This private key ($sk_V$) corresponds to the public key ($pk_V$) stored in the digital certificate ($cert_V$). In some embodiments, the private key ($sk_V$) is maintained securely by the vendor (e.g., in its own HSM). In some embodiments, any valid digital signature algorithm can be used (e.g., RSA, DSA, EcDSA, etc.). As one example, step 304 can include computing a digest (e.g., hash) of the image and encrypting the digest with the private key ($sk_V$) to generate a signature ($sig_i$) for the image.

In step 306, method 300 can include providing the signed image and the digital certificate ($cert_V$) to the device. In some embodiments, the signed image can comprise the original image and the signature ($sig_i$). In some embodiments, the vendor can transmit the signed image and the digital certificate ($cert_V$) over a secure or insecure channel. In some embodiments, the channel can comprise a network while other approaches (e.g., physical media) can be used to deliver the image.

As illustrated, a period of time can occur between step 306 and step 308. The disclosure places no limit on the duration of time between step 306 and step 308. Further, in some embodiments, step 308 through step 322 can be executed by a device, while step 302 through step 306 can be executed by a vendor.

In step 308, method 300 can include receiving the signed image (e.g., image and signature, $sig_i$) and digital certificate ($cert_V$) from the vendor. As discussed, the device can receive this data over a secure or insecure network or via physical media.

In step 310, method 300 can include validating the digital certificate ($cert_V$). In some embodiments, the digital certificate ($cert_V$) is issued by a trusted CA, and step 310 can include identifying a public key for a trusted CA in the chain hierarchy. Details of validating a digital certificate issued by a CA are not included herein for the sake of brevity, and any techniques for validating a digital certificate can be used. In brief, method 300 can load the server public key ($pk_S$) to validate the digital signature provided by the server (e.g., in step 210). In this manner, method 300 can confirm that the trusted server actually issued and received the digital certificate (cert$_V$) and that the digital certificate (cert$_V$) was not tampered with since then. In some embodiments, step 310 can also include determining if a validity period of the digital certificate (cert$_V$) is still valid based on the current date and/or time.

In step 312, method 300 can include determining if the digital certificate (cert$_V$) is valid. If not, method 300 can proceed to step 322 and reject the image. Specifically, in some embodiments, method 300 can discard the image and end processing, thus preventing an image associated with an invalid digital certificate from being executed on the device. Alternatively, if the digital certificate (cert$_V$) is validated, method 300 can proceed to step 314.

In step 314, method 300 can comprise reading the public key (pk$_V$) from the digital certificate (cert$_V$). As discussed, the digital certificate (cert$_V$) can include the vendor's public key (pk$_V$). Thus, instead of loading a public key from a key storage region, method 300 can load the public key (pk$_V$) directly from the certificate. Since the digital certificate (cert$_V$) was previously validated, method 300 can presume that the public key (pk$_V$) in the digital certificate (cert$_V$) is not tampered with.

In step 316, method 300 can include validating the digital signature (sig$_i$) generated by the vendor using the vendor's private key (sk$_V$) and included with the image and digital certificate (cert$_V$). In some embodiments, step 316 can include re-calculating a digest (dig) of the image and then decrypting the digital signature (sig$_i$) using the public key (pk$_V$) read from the digital certificate (cert$_V$).

In step 318, method 300 can include determining if the digital signature (sig$_i$) is valid. In some embodiments, step 318 can include comparing the computed digest (dig) with the decrypted digital signature (sig$_i$) and determining if the results are equal. If not, the image is not valid, and method 300 proceeds to step 322 to reject the image (previously discussed). If the results are equal, the image is valid, and method 300 can proceed to step 320.

In step 320, method 300 can load, store, or otherwise process the received image. In some embodiments, step 320 can include writing the image to a storage device. Details of processing an image are not limiting, and any type of processing of an image can be performed in step 320.

Figure 4:
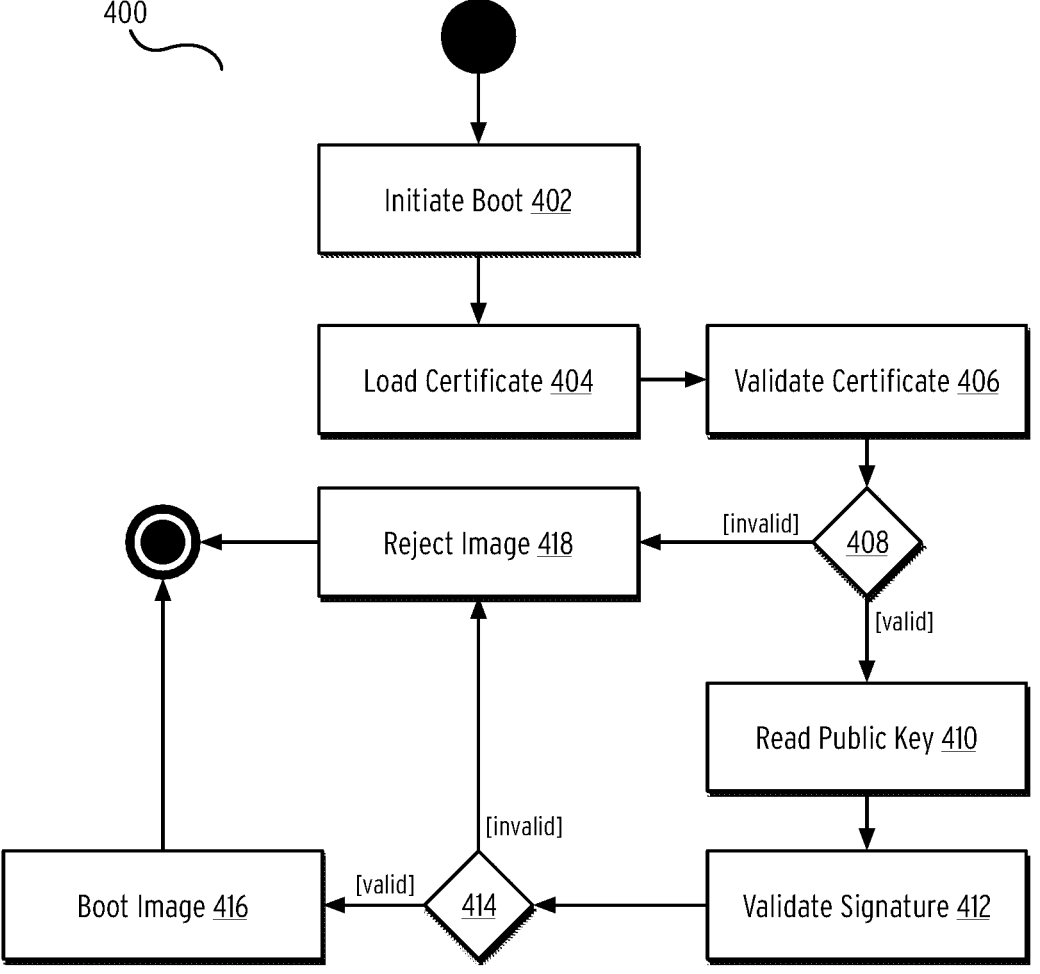
FIG. 4 is a flow diagram illustrating a method for generating and validating a secure boot image according to some of the example embodiments.

FIG. 4 is a flow diagram illustrating a method for generating and validating a secure boot image according to some of the example embodiments.

In step 402, method 400 can include initiating booting of a device. In some embodiments, step 402 can be initiated after a power-on or reset operation is performed on the device. As part of the booting, method 400 can include loading a first-stage bootloader (FSB) or second-stage bootloader (SSB) image.

In step 404, method 400 can include loading a digital certificate. In some embodiments, the digital certificate can comprise a digital certificate previously written to a secure area of the device. For example, method 300 can be used to write an FSB or SSB image and can receive the digital certificate of the vendor as part of this method 300. In an embodiment, method 300 can be extended to persistently store the digital certificate (cert$_V$) of the FSB or SSB for use during booting.

In step 406, method 400 can include validating the digital certificate (cert$_V$) loaded in step 404. In some embodiments, the digital certificate (cert$_V$) is issued by a trusted CA, and step 406 can include identifying a public key for a trusted CA in the chain hierarchy. Details of validating a digital certificate issued by a CA are not included herein for the sake of brevity, and any techniques for validating a digital certificate can be used. In brief, method 400 can load the server public key (pk$_S$) to validate the digital signature provided by the server. In this manner, method 400 can confirm that the trusted server actually issued and received the digital certificate (cert$_V$) and that the digital certificate (cert$_V$) was not tampered with since then. In some embodiments, step 406 can also include determining if a validity period of the digital certificate (cert$_V$) is still valid based on the current date and/or time.

In step 408, method 400 can include determining if the digital certificate (cert$_V$) is valid. If not, method 400 can proceed to step 418 and reject the FSB or SSB. Specifically, in some embodiments, method 400 can discard the FSB or SSB and end processing, thus preventing an FSB or SSB associated with an invalid digital certificate from booting the device. Alternatively, if the digital certificate (cert$_V$) is validated, method 400 can proceed to step 410.

In step 410, method 400 can comprise reading the public key (pk$_V$) from the digital certificate (cert$_V$) associated with the FSB or SSB. As discussed, the digital certificate (cert$_V$) can include the vendor's public key (pk$_V$). Thus, instead of loading a public key from a key storage region, method 400 can load the public key (pk$_V$) directly from the certificate. Since the digital certificate (cert$_V$) was previously validated, method 400 can presume that the public key (pk$_V$) in the digital certificate (cert$_V$) is not tampered with.

In step 412, method 400 can include validating the digital signature (sig$_i$) generated by the vendor using the vendor's private key (sk$_V$) and included with the FSB or SSB and digital certificate (cert$_V$). In some embodiments, step 316 can include re-calculating a digest (dig) of the FSB or SSB and then decrypting the digital signature (sig$_i$) using the public key (pk$_V$) read from the digital certificate (cert$_V$).

In step 414, method 400 can include determining if the digital signature (sig$_i$) is valid. In some embodiments, step 414 can include comparing the computed digest (dig) with the decrypted digital signature (sig$_i$) and determining if the results are equal. If not, the FSB or SSB image is not valid, and method 400 proceeds to step 418 to reject the FSB or SSB image (previously discussed). If the results are equal, the FSB or SSB image is valid, and method 400 can proceed to step 416.

In step 416, method 400 can boot to the FSB or SSB image. Details of booting a bootloader are not limiting and any type of booting of a bootloader image can be performed in step 416.

Figure 5:
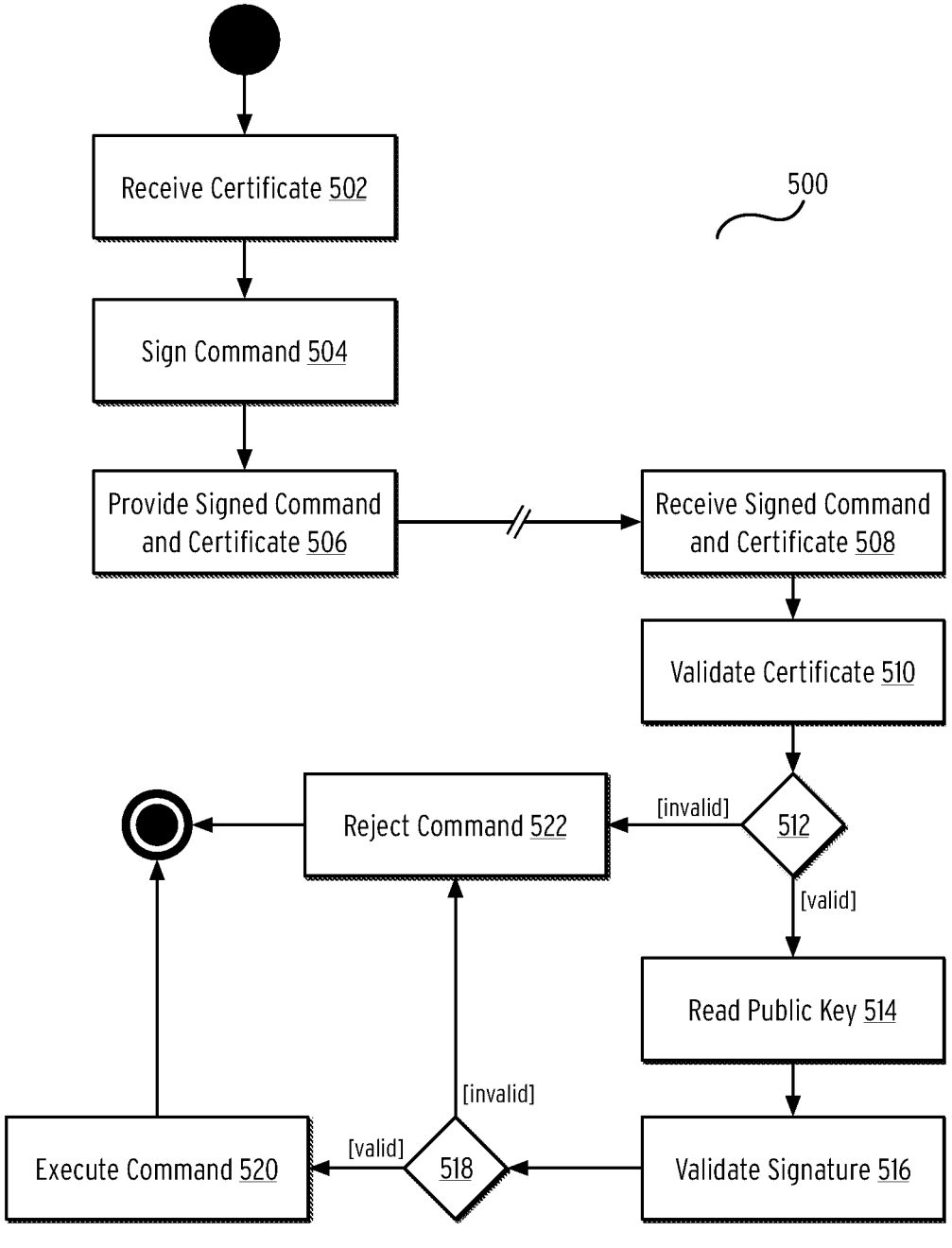
FIG. 5 is a flow diagram illustrating a method for generating and validating a secure command according to some of the example embodiments.

FIG. 5 is a flow diagram illustrating a method for generating and validating a secure command according to some of the example embodiments.

In step 502, method 500 can include a vendor receiving a digital certificate (cert$_V$) from a server. In some embodiments, the digital certificate (cert$_V$) corresponds to the digital certificate (cert$_V$) returned in step 212 of FIG. 2 and details of that digital certificate (cert$_V$) are not repeated herein. In brief, the digital certificate (cert$_V$) is generated by a server using the vendor's public key (pk$_V$) using a CSR signed by the vendor.

In step 504, method 500 can include signing a command. In some embodiments, step 504 can include signing a command using a private key (sk$_V$) of the vendor. This private key (sk$_V$) corresponds to the public key (pk$_V$) stored in the digital certificate (cert$_V$). In some embodiments, the private key (sk$_V$) is maintained securely by the vendor (e.g., in its own HSM). In some embodiments, any valid digital signature algorithm can be used (e.g., RSA, DSA, Elliptic Curve Digital Signature Algorithm, etc.). As one example, step 504 can include computing a digest (e.g., hash) of the command and encrypting the digest with the private key ($sk_V$) to generate a signature ($sig_i$) for the command. The command can comprise any command executable by a device. For example, the command can include an operand, zero or more configuration options, and zero or more parameters. One example of a command is a command to add or replace a public key stored by the device.

In step 506, method 500 can include providing the signed command and the digital certificate ($cert_V$) to the device. In some embodiments, the signed command can comprise the original command and the signature ($sig_i$). In some embodiments, the vendor can transmit the signed command and the digital certificate ($cert_V$) over a secure or insecure channel. In some embodiments, the channel can comprise a network while other approaches (e.g., physical media) can be used to deliver the command.

As illustrated, a period of time can occur between step 506 and step 508. The disclosure places no limit on the duration of time between step 506 and step 508. Further, in some embodiments, step 508 through step 522 can be executed by a device, while step 502 through step 506 can be executed by a vendor.

In step 508, method 500 can include receiving the signed command (e.g., command and signature, $sig_i$) and digital certificate ($cert_V$) from the vendor. As discussed, the device can receive this data over a secure or insecure network or via physical media.

In step 510, method 500 can include validating the digital certificate ($cert_V$). In some embodiments, the digital certificate ($cert_V$) is issued by a trusted CA, and step 510 can include identifying a public key for a trusted CA in the chain hierarchy. Details of validating a digital certificate issued by a CA are not included herein for the sake of brevity, and any techniques for validating a digital certificate can be used. In brief, method 500 can load the server public key ($pk_S$) to validate the digital signature provided by the server (e.g., in step 210). In this manner, method 500 can confirm that the trusted server actually issued and received the digital certificate ($cert_V$) and that the digital certificate ($cert_V$) was not tampered with since then. In some embodiments, step 510 can also include determining if a validity period of the digital certificate ($cert_V$) is still valid based on the current date and/or time.

In step 512, method 500 can include determining if the digital certificate ($cert_V$) is valid. If not, method 500 can proceed to step 522 and reject the command. Specifically, in some embodiments, method 500 can discard the command and end processing, thus preventing a command associated with an invalid digital certificate from being executed on the device. Alternatively, if the digital certificate ($cert_V$) is validated, method 500 can proceed to step 514.

In step 514, method 500 can comprise reading the public key ($pk_V$) from the digital certificate ($cert_V$). As discussed, the digital certificate ($cert_V$) can include the vendor's public key ($pk_V$). Thus, instead of loading a public key from a key storage region, method 500 can load the public key ($pk_V$) directly from the certificate. Since the digital certificate ($cert_V$) was previously validated, method 500 can presume that the public key ($pk_V$) in the digital certificate ($cert_V$) is not tampered with.

In step 516, method 500 can include validating the digital signature ($sig_i$) generated by the vendor using the vendor's private key ($sk_V$) and included with the command and digital certificate ($cert_V$). In some embodiments, step 516 can include re-calculating a digest (dig) of the command and then decrypting the digital signature ($sig_i$) using the public key ($pk_V$) read from the digital certificate ($cert_V$).

In step 518, method 500 can include determining if the digital signature ($sig_i$) is valid. In some embodiments, step 518 can include comparing the computed digest (dig) with the decrypted digital signature ($sig_i$) and determining if the results are equal. If not, the command is not valid, and method 500 proceeds to step 522 to reject the command (previously discussed). If the results are equal, the command is valid, and method 500 can proceed to step 520.

In step 520, method 500 can execute the received command (including failing if the command is authentic but not supported). Details of processing a command are not limiting, and any type of processing of a command can be performed in step 520.

Figure 6:
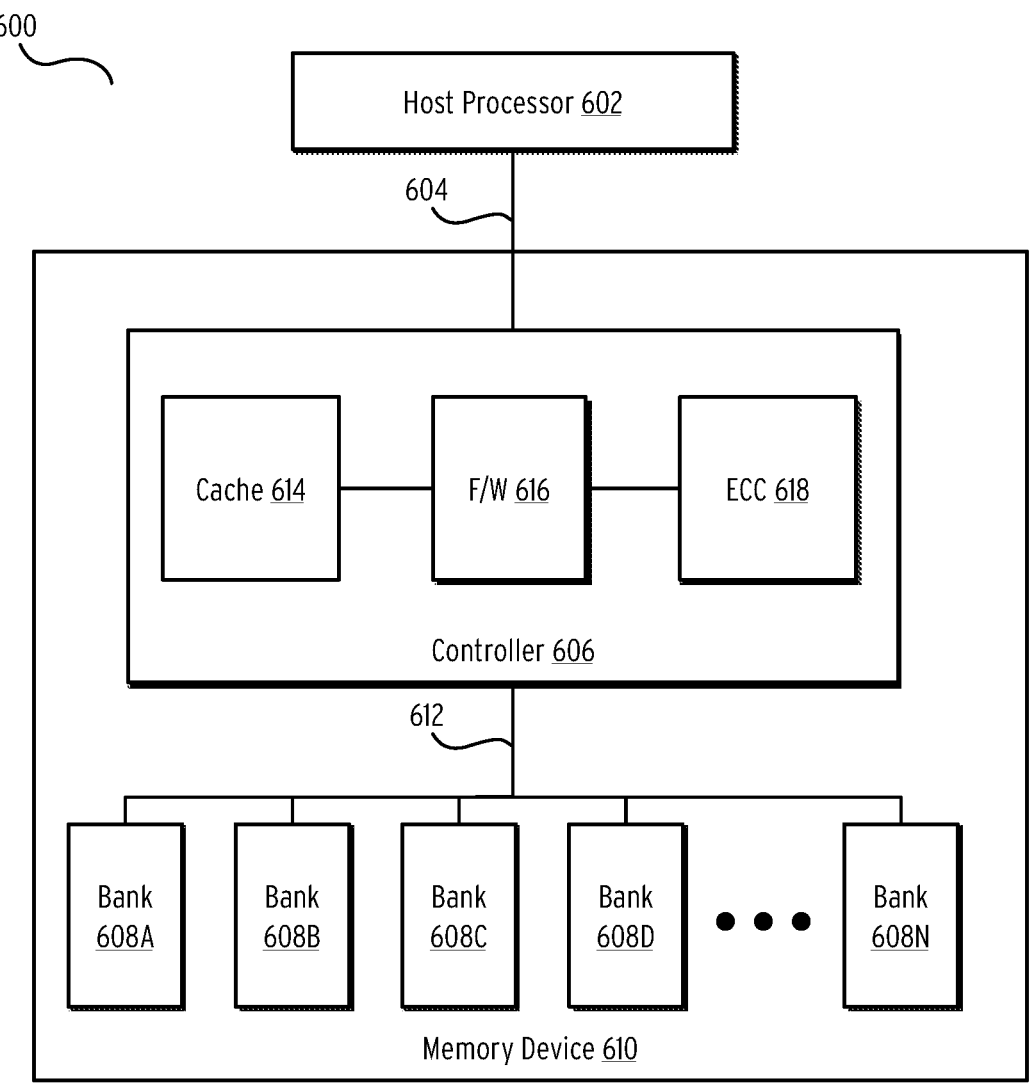
FIG. 6 is a block diagram illustrating a memory system according to some embodiments of the disclosure.

FIG. 6 is a block diagram illustrating a memory system according to some embodiments of the disclosure.

As illustrated, a computing system 600 includes a host processor 602 communicatively coupled to a memory device 610 via a bus 604. The memory device 610 comprises a controller 606 communicatively coupled to one or more memory banks (e.g., bank 608A, bank 608B, bank 608C, bank 608D, bank 608N, etc.), forming a memory array via an interface 612. As illustrated, the controller 606 includes a local cache 614, firmware 616, and an ECC module 618.

In the illustrated embodiment, host processor 602 can comprise any type of computer processor, such as a central processing unit (CPU), graphics processing unit (GPU), or other types of general-purpose or special-purpose computing devices. The host processor 602 includes one or more output ports that allow for the transmission of address, user, and control data between the host processor 602 and the memory device 610. In the illustrated embodiment, this communication is performed over the bus 604. In one embodiment, the bus 604 comprises an input/output (I/O) bus or a similar type of bus.

The memory device 610 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, the interface 612 comprises a standard bus for communicating with memory banks (e.g., bank 608A, bank 608B, bank 608C, bank 608D, bank 608N, etc.).

The controller 606 comprises various modules including local cache 614, firmware 616 and ECC module 618. In one embodiment, the various modules (e.g., local cache 614, firmware 616 and ECC module 618) comprise various physically distinct modules or circuits. In other embodiments, the modules (e.g., local cache 614, firmware 616 and ECC module 618) may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in the foregoing figures.

Figure 7:
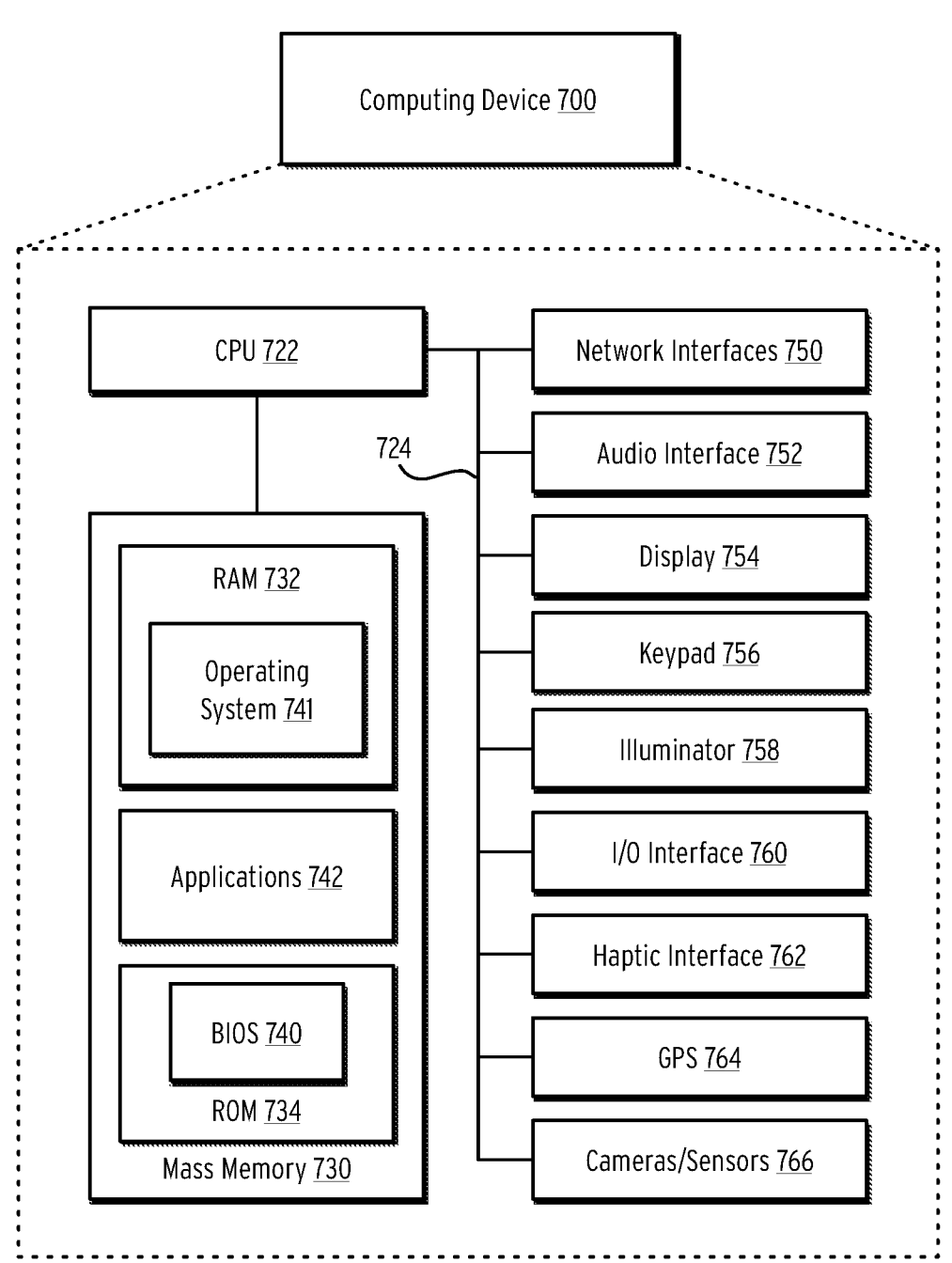
FIG. 7 is a block diagram illustrating a computing device 700 showing an example embodiment of a computing device used in the various embodiments of the disclosure.

FIG. 7 is a block diagram illustrating a computing device 700 showing an example embodiment of a computing device used in the various embodiments of the disclosure.

The computing device 700 may include more or fewer components than those shown in FIG. 7. For example, a server computing device may not include audio interfaces, displays, keypads, illuminators, haptic interfaces, GPS receivers, cameras, or sensors.

As shown in the figure, the computing device 700 includes a processing unit such as CPU 722 in communication with a mass memory 730 via a bus 724. The computing device 700 also includes one or more network interfaces 750, an audio interface 752, a display 754, a keypad 756, an illuminator 758, an input/output interface 760, a haptic interface 762, a Global Positioning System transceiver (GPS transceiver 764) and one or more sensors 766, such as cameras or other optical, thermal, or electromagnetic. The positioning of the one or more sensors 766 on the computing device 700 can change per computing device 700 model, per computing device 700 capabilities, and the like, or some combination thereof.

The computing device 700 may optionally communicate with a base station (not shown) or directly with another computing device. A network interface is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises input/output interface 760 for communicating with external devices, using communication technologies, such as USB, infrared, Bluetooth™, or the like. The haptic interface 762 provides tactile feedback to a user of the client device.

The GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may, through other components, provide other information that may be employed to determine a physical location of the device, including, for example, a MAC address, Internet Protocol (IP) address, or the like.

Mass memory 730 includes a RAM 732, a ROM 734, and other storage means. Mass memory 730 illustrates another example of computer storage media for storage of information such as computer-readable instructions, data structures, program modules, or other data. Mass memory 730 stores a basic input/output system (BIOS 740) for controlling the low-level operation of the computing device 700. The mass memory also stores an operating system 741 for controlling the operation of the computing device 700

Applications 742 may include computer-executable instructions which, when executed by the computing device 700, perform any of the methods (or portions of the methods) described previously in the description of the preceding Figures. In some embodiments, the software or programs implementing the method embodiments can be read from hard disk drive (not illustrated) and temporarily stored in RAM 732 by CPU 722. CPU 722 may then read the software or data from RAM 732, process them, and store them to RAM 732 again.

The disclosure includes various devices which perform the methods and implement the systems described above, including data processing systems which perform these methods, and computer-readable media containing instructions which, when executed on data processing systems, cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to "one" or "an" embodiment in the present disclosure do not necessarily reference the same embodiment and such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments, but not other embodiments.

In this description, various functions and operations may be described as being performed by or caused by software code to simplify description. However, those skilled in the art will recognize what is meant by such expressions is that the functions result from the execution of the code by one or more processors, such as a microprocessor, Application-Specific Integrated Circuit (ASIC), graphics processor, or a Field-Programmable Gate Array (FPGA). Alternatively, or in combination, the functions and operations can be implemented using special-purpose circuitry (e.g., logic circuitry), with or without software instructions. Embodiments can be implemented using hardwired circuitry without software instructions or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system, middleware, service delivery platform, SDK (Software Development Kit) component, web services, or other specific application, component, program, object, module, or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places, including, for example, ROM, volatile RAM, non-volatile memory, or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or mobile devices, a user terminal, a vehicle, a personal communications device, a wearable digital device, an electronic kiosk, a general-purpose computer, an electronic document reader, a tablet, a laptop computer, a smartphone, a digital camera, a residential, domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field-programmable gate array (FPGA), an application-specific integrated circuit (ASIC), etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

I claim:

1. A device comprising:
a secure storage area, the secure storage area including a first public key written during manufacturing of the device, the first public key associated with a server that issues digital certificates to vendors; and
a controller configured to:
receive data, the data including a payload, digital certificate storing a second public key associated with a vendor, and digital signature generated by the vendor using a private key corresponding to the second public key, validate the digital certificate using the first public key, wherein validating the digital certificate confirms the digital certificate was issued by the server, extract the second public key from the digital certificate, validate the digital signature using the second public key, and process the payload in response to successfully validating both the digital certificate and the digital signature, wherein the controller is configured to reject the payload and end processing when the digital certificate validation fails or the digital signature validation fails.

2. The device of claim 1, wherein the controller is configured to receive the data from a remote computing system, and wherein the payload comprises a software image.

3. The device of claim 2, wherein processing the payload comprises writing the software image to a storage device.

4. The device of claim 1, wherein the payload comprises a bootloader stored by the device and wherein processing the payload comprises executing the bootloader.

5. The device of claim 1, wherein the controller is configured to receive the data from a remote computing system, and wherein the payload comprises a command.

6. The device of claim 5, wherein processing the payload comprises executing the command.

7. The device of claim 1, wherein validating the digital certificate comprises determining that the digital certificate is not expired.

8. The device of claim 1, wherein the digital certificate is signed using a private key corresponding to the first public key.

9. A method comprising:

receiving, by a computing device, data, the data including a payload, digital certificate storing a second public key associated with a vendor, and digital signature generated by the vendor using a private key corresponding to the second public key;

validating, by the computing device, the digital certificate using a first public key, the first public key written during manufacturing of the computing device, the first public key associated with a server that issues digital certificates to vendors, wherein validating the digital certificate confirms the digital certificate was issued by the server;

extracting, by the computing device, the second public key from the digital certificate;

validating, by the computing device, the digital signature using the second public key; and processing, by the computing device, the payload in response to successfully validating both the digital certificate and the digital signature, wherein the computing device is configured to reject the payload and end processing when the digital certificate validation fails or the digital signature validation fails.

10. The method of claim 9, wherein receiving data comprises receiving the data from a remote computing system, and wherein the payload comprises a software image.

11. The method of claim 10, wherein processing the payload comprises writing the software image to a storage device.

12. The method of claim 9, wherein the payload comprises a bootloader and wherein processing the payload comprises executing the bootloader.

13. The method of claim 9, wherein receiving data comprises receiving the data from a remote computing system, and wherein the payload comprises a command.

14. The method of claim 13, wherein processing the payload comprises executing the command.

15. The method of claim 9, wherein validating the digital certificate comprises determining that the digital certificate is not expired.

16. The method of claim 9, wherein the digital certificate is signed using a private key corresponding to the first public key.

17. A non-transitory computer-readable storage medium for tangibly storing computer program instructions capable of being executed by a computer processor, the computer program instructions defining steps of:

receiving data, the data including a payload, digital certificate storing a second public key associated with a vendor, and digital signature generated by the vendor using a private key corresponding to the second public key;

validating the digital certificate using a first public key, the first public key written during manufacturing of the non-transitory computer-readable storage medium, the first public key associated with a server that issues digital certificates to vendors, wherein validating the digital certificate confirms the digital certificate was issued by the server;

extracting the second public key from the digital certificate;

validating the digital signature using the second public key; and processing the payload in response to successfully validating both the digital certificate and the digital signature, wherein the non-transitory computer-readable storage medium is configured to reject the payload and end processing when the digital certificate validation fails or the digital signature validation fails.

18. The non-transitory computer-readable storage medium of claim 17, wherein receiving data comprises receiving the data from a remote computing system, wherein the payload comprises a software image, and wherein processing the payload comprises writing the software image to a storage device.

19. The non-transitory computer-readable storage medium of claim 17, wherein the payload comprises a bootloader and wherein processing the payload comprises executing the bootloader.

20. The non-transitory computer-readable storage medium of claim 17, wherein receiving data comprises receiving the data from a remote computing system, wherein the payload comprises a command, and wherein processing the payload comprises executing the command.

* * * * *